(12) United States Patent
Schumnig et al.

(10) Patent No.: US 9,964,026 B2
(45) Date of Patent: May 8, 2018

(54) OVERRUN AIR RECIRCULATION VALVE OF AN EXHAUST-GAS TURBOCHARGER COMPRESSOR

(71) Applicants: BorgWarner Inc., Auburn Hills, MI (US); Woco Industrietechnik GmbH, Bad Soden-Salmuenster (DE)

(72) Inventors: Oliver Schumnig, Gundersheim (DE); Franz-Josef Brulin, Bad Soden-Salmuenster (DE); Torsten Hofmann, Bad Soden-Salmuenster (DE)

(73) Assignees: BorgWarner Inc., Auburn Hills, MI (US); Woco Industrietechnik GmbH, Bad Soden-Salmuenster (DE)

( * ) Notice: Subject to any disclaimer, the term of this patent is extended or adjusted under 35 U.S.C. 154(b) by 324 days.

(21) Appl. No.: 14/651,336

(22) PCT Filed: Nov. 26, 2013

(86) PCT No.: PCT/US2013/071930
§ 371 (c)(1),
(2) Date: Jun. 11, 2015

(87) PCT Pub. No.: WO2014/099302
PCT Pub. Date: Jun. 26, 2014

(65) Prior Publication Data
US 2015/0315962 A1    Nov. 5, 2015

(30) Foreign Application Priority Data
Dec. 20, 2012   (DE) ........................ 10 2012 025 411

(51) Int. Cl.
*F02B 37/14*    (2006.01)
*F02B 37/16*    (2006.01)
(Continued)

(52) U.S. Cl.
CPC ............ *F02B 37/14* (2013.01); *F01D 17/105* (2013.01); *F02B 37/16* (2013.01); *F02B 39/00* (2013.01);
(Continued)

(58) Field of Classification Search
CPC .......... F02B 37/14; F02B 37/16; F02B 39/00; F01D 17/105
(Continued)

(56) References Cited

U.S. PATENT DOCUMENTS 2,300,722 A * 11/1942 Kleinhans ................. F15B 1/12
                                                               138/30
3,154,286 A * 10/1964 McFarland, Jr. ....... F16K 7/126
                                                               251/331
(Continued)

FOREIGN PATENT DOCUMENTS

| CA | 2285586 A1 * | 4/2001 | .......... F04B 43/0054 |
| DE | 9306501 U1 * | 9/1993 | .......... F04B 43/0054 |
| WO | WO 2005089389 A2 * | 9/2005 | .......... F04B 43/0054 |

OTHER PUBLICATIONS

International Search Report in International Application No. PCT/US2013/071930, dated Mar. 21, 2014.

*Primary Examiner* — Jason Newton
(74) *Attorney, Agent, or Firm* — Eric L. Doyle; Stephan A. Pendorf; Patent Central LLC

(57) ABSTRACT

An overrun air recirculation valve 1 of an exhaust-gas turbocharger compressor 2, having a valve housing 3 which has an interior 4, having a diaphragm 5 which is guided in the interior 4 and which has an edge-side sealing means 6; and having a connecting means 7 provided on the valve housing 3, wherein the sealing means 6 is in the form of a sealing means which acts in the radial direction R of the diaphragm 5.

9 Claims, 2 Drawing Sheets

Figure 1:
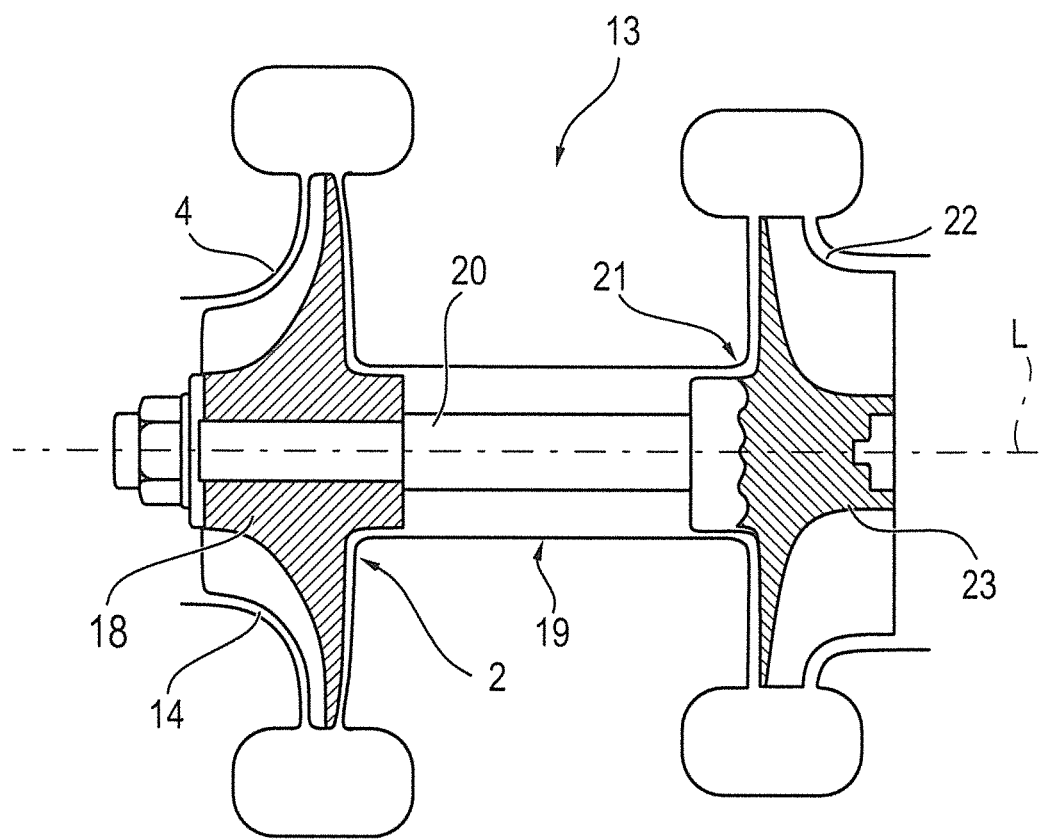

(51) Int. Cl.
*F02B 39/00* (2006.01)
*F01D 17/10* (2006.01)

(52) U.S. Cl.
CPC ......... *F05D 2220/40* (2013.01); *Y02T 10/144* (2013.01); *Y10T 29/49828* (2015.01)

(58) Field of Classification Search
USPC .................................................. 415/52.1, 145
See application file for complete search history.

(56) References Cited

U.S. PATENT DOCUMENTS

| | | | | |
|---|---|---|---|---|
| 3,779,274 A * | 12/1973 | Kelly | ........................ | F16K 7/17 137/494 |
| 4,175,590 A * | 11/1979 | Grandclement | ........ | B29C 65/08 137/883 |
| 4,610,605 A * | 9/1986 | Hartley | ............... | F04B 43/0054 417/269 |
| 5,031,875 A * | 7/1991 | Zimmerman | ............. | F16K 7/12 251/61.1 |
| 5,909,725 A | 6/1999 | Balsdon et al. | | |
| 6,062,258 A * | 5/2000 | Diehl | ................. | G05D 16/0663 137/505 |
| 6,089,538 A * | 7/2000 | Shirkhan | ................... | F16K 7/12 137/606 |
| 6,135,092 A * | 10/2000 | Schaenzer | .............. | F02M 55/04 123/456 |
| 6,237,621 B1 * | 5/2001 | Chaffee | ................ | A47C 27/081 137/223 |
| 6,295,918 B1 * | 10/2001 | Simmons | ............ | F04B 43/0054 92/98 R |
| 6,898,934 B1 | 5/2005 | Bayer et al. | | |
| 7,011,397 B2 * | 3/2006 | Miyazawa | ........... | B41J 2/17513 347/86 |
| 7,213,586 B2 | 5/2007 | Wilson et al. | | |
| 8,235,352 B2 * | 8/2012 | Irwin | .................... | F16K 31/402 251/14 |
| 8,714,201 B2 * | 5/2014 | Teng | ......................... | E03C 1/08 137/504 |
| 9,010,729 B2 * | 4/2015 | Baumann | .............. | F16K 41/103 251/331 |
| 9,684,315 B2 * | 6/2017 | Nakamura | ............ | G05D 16/06 |
| 9,751,689 B2 * | 9/2017 | DiNovo | ................ | B65D 90/041 |
| 2006/0118751 A1 * | 6/2006 | Lodolo | .................... | F16K 7/126 251/331 |
| 2008/0251742 A1 * | 10/2008 | Ise | ........................ | F25B 41/062 251/11 |
| 2009/0087302 A1 * | 4/2009 | Grzonkowski | ......... | F02B 37/16 415/52.1 |
| 2012/0015549 A1 | 1/2012 | Youn et al. | | |
| 2015/0041691 A1 * | 2/2015 | Buhler | ................... | F16K 7/126 251/129.01 |

* cited by examiner

OVERRUN AIR RECIRCULATION VALVE OF AN EXHAUST-GAS TURBOCHARGER COMPRESSOR

The invention relates to an overrun air recirculation valve as per the preamble of claim 1, to a compressor of an exhaust-gas turbocharger as per the preamble of claim 10, and to a method as per claim 12.

A generic overrun air recirculation valve and a generic compressor are known from DE 20 2009 013 401 U1. Here, for the fastening of the overrun air recirculation valve to the compressor housing, use is made of a screw connection means which requires a multiplicity of bores in the valve housing, spacer sleeves arranged in said bores, and a number of screws and internal threads in the compressor housing, said number corresponding to the number of bores.

It is accordingly an object of the present invention to provide an overrun air recirculation valve and a compressor as per the preamble of claim 1 and the preamble of claim 10, respectively, which are of simpler construction and easier to assemble.

This object is achieved by the features of claim 1.

The embodiment of the overrun air recirculation valve according to the invention makes it possible for said overrun air recirculation valve to be completely preassembled to form a valve cartridge, the latter being delivered in the completely preassembled state for attachment to the compressor, it then being possible for said valve cartridge to be fastened to the fastening flange of the compressor housing in a simple and fast manner by way of the connecting means.

The sealing means of the overrun air recirculation valve according to the invention is in this case in the form of a radial seal which acts in the radial direction of the diaphragm and which takes effect during the course of the mounting process.

Dependent claims 2 to 9 relate to advantageous developments of the overrun air recirculation valve according to the invention.

Claims 10 and 11 define the compressor according to the invention as an object which can be marketed independently.

Claim 12 defines a mounting method in which the overrun air recirculation valve is completely preassembled with its valve housing, its diaphragm with the edge-side sealing means thereof, and the other components of such overrun air recirculation valves such as for example a spring and a valve plate.

After delivery of the overrun air recirculation valve cartridge that is preassembled in this way, said cartridge can be fixed to the compressor in a simple manner, in particular if the connecting means of the overrun air recirculation valve according to the invention is in the form of a clip-type connecting means. A clip-type connecting means of said type generally has a multiplicity of clip lugs which extend in the axial direction of the valve plate and which each comprise detent catches. Here, the clip lugs are preferably of elastically resilient form and, at their free ends, have preferably conically chamfered detent catches which, as the overrun air recirculation valve is pushed onto the fastening flange of the compressor housing, can engage behind an annularly encircling detent edge of the compressor housing, whereby the fixing of the overrun air recirculation valve to the compressor housing can be realized.

In the design according to the invention, a screw connection would alternatively also be conceivable, preferably at three eyelets of the valve housing on the circumference thereof.

Figure 2:
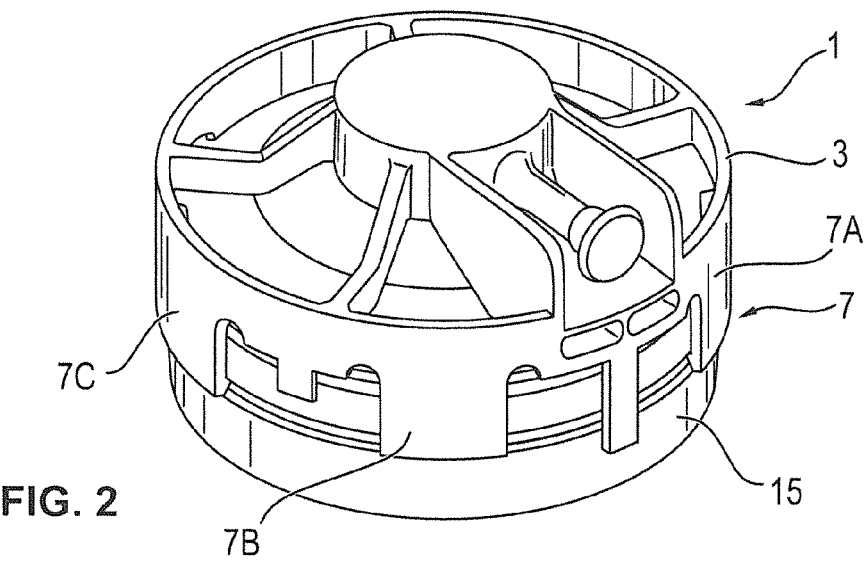
Figure 3:
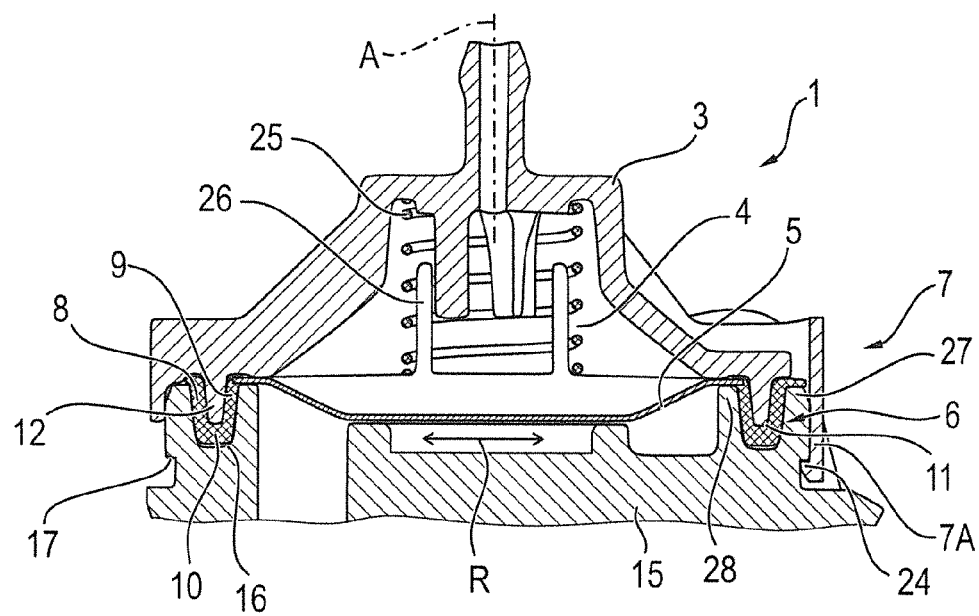
Figure 4:
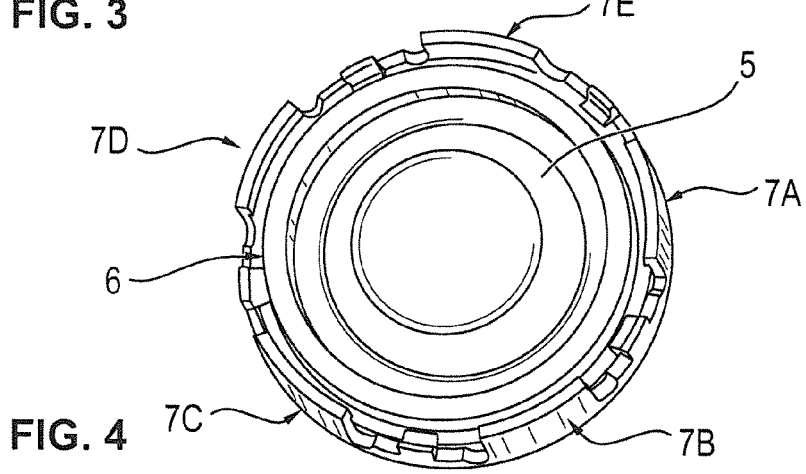

Further details, advantages and features of the present invention become apparent from the following description of an exemplary embodiment with reference to the drawing, in which:

FIG. 1 is a schematically highly simplified illustration of an exhaust-gas turbocharger which can be provided with the overrun air recirculation valve according to the invention and the compressor according to the invention, FIG. 2 is a perspective illustration of the overrun air recirculation valve according to the invention in the state in which it is fixed to a fastening flange of the compressor housing, FIG. 3 is a sectional illustration through the overrun air recirculation valve as per FIG. 2, and FIG. 4 is a view of the overrun air recirculation valve as per FIG. 2 from below, in the direction of its diaphragm.

FIG. 1 shows an exhaust-gas turbocharger 13 in a schematically highly simplified illustration, which exhaust-gas turbocharger can be provided with an overrun air recirculation valve 1 and a compressor 2 such as will be described on the basis of FIGS. 2 to 4.

In addition to the compressor 2 with its compressor housing 14 and the compressor wheel 18 arranged in the compressor housing 14, the exhaust-gas turbocharger 13 has a bearing housing 19 in which a shaft 20 is mounted, which shaft, at its two ends, bears the compressor wheel 18 at one end and, at the other end, bears a turbine wheel 23 which is arranged in a turbine housing 22 of a turbine 21. The exhaust-gas turbocharger 13 according to the invention self-evidently also has all the other components of such turbochargers, the explanation of which is however not necessary for the explanation of the principles of the present invention.

The overrun air recirculation valve 1 according the invention is illustrated in a perspective view in FIG. 2. The overrun air recirculation valve 1 has a valve housing 3 which, on its outer circumference, is provided with a connecting means 7, the latter preferably being in the form of a clip-type connecting means which has a multiplicity of clip lugs, of which the clip lugs 7A to 7C are visible in FIG. 2. As can be seen from the illustration of FIG. 4, however, it is the case in the illustrated embodiment that the connecting means 7 has a total of five such clip lugs 7A to 7E. The number of said lugs is dependent on the installation conditions and/or the configuration of the exhaust-gas turbocharger 13 and/or of the compressor 2, and may vary according to the usage situation.

FIG. 2 shows the mounted state of the overrun air recirculation valve 1 on a fastening flange 15, as will be explained in detail below on the basis of FIG. 3.

Here, FIG. 3 shows that the valve housing 3 has an interior 4 in which a diaphragm 5 is guided over a valve plate 26 which is acted on by a restoring spring 25.

The diaphragm 5 is provided, at the edge side, with a sealing means 6 which is connected to the diaphragm 5, the latter preferably being captively attached to the valve housing 3.

As can be seen from the illustration of FIG. 3, the sealing means, which is a sealing means that acts in the radial direction R of the diaphragm 5, has two radial, annularly encircling sealing lips or sealing rings 8 and 9 in the example. In the particularly preferred embodiment illustrated in FIG. 3, the sealing lips 8 and 9 are integrally connected to one another via a connecting portion 10. As illustrated in FIG. 3, said sealing lips may form a V-shaped configuration or else a U-shaped configuration.

As is also illustrated in FIG. 3, the sealing lips 8, 9 and the connecting portion 10 delimit a space 11 into which a fixing wedge (fixing cone or fixing cylinder) engages. As a result of said engagement of the fixing wedge 12, the sealing lips 8 and 9 are pressed radially against walls 27 and 28 of an annularly encircling receiving groove 16, which is open on the face side, of the fastening flange 15 of the compressor 2, and thereby build up the sealing action.

Finally, FIG. 3 shows that the fastening flange 15 has an annularly encircling detent edge 17 which interacts with a detent catch 24 of the clip lugs 7A to 7E, wherein only the lug 7A with its associated detent catch 24 is visible in FIG. 3.

In addition to the above written description of the invention, reference is hereby explicitly made, for supplementation thereof, to the diagrammatic illustration of the invention in FIGS. 1 to 4.

LIST OF REFERENCE SIGNS

1 Overrun air recirculation valve
2 Compressor
3 Valve housing
4 Interior
5 Diaphragm
6 Edge-side sealing means
7 Connecting means
7A-7E Clip lugs
8, 9 Sealing lips
10 Connecting portion
11 Space
12 Fixing wedge
13 Exhaust-gas turbocharger
14 Compressor housing
15 Fastening flange
16 Receiving groove
17 Detent edge
18 Compressor wheel
19 Bearing housing
20 Shaft
21 Turbine
22 Turbine housing
23 Turbine wheel
L Longitudinal direction of the exhaust-gas turbocharger 13
R Radial direction of the diaphragm 5
A Axial direction of the valve plate

The invention claimed is:

1. An overrun air recirculation valve (1) of an exhaust-gas turbocharger compressor (2), having
a valve housing (3) which has an interior (4) and a center axis (A) extending in an axial direction,
a diaphragm (5), which is guided in the interior (4) and has an annularly encircling sealing means (6); and
a connecting means (7) provided on the valve housing (3), comprising a multiplicity of clip lugs which extend in the axial direction of the valve housing and which each comprise detent catches,
wherein the annularly encircling sealing means (6) comprises first and second sealing lips (8, 9),
wherein a fixing wedge (12) engages into a space (11) between the sealing lips (8, 9)
wherein the fixing wedge (12) has a radially outward facing surface and a radially inward facing surface, and
wherein the fixing wedge (12) radially outward facing surface urges the first sealing lip radially outward, and the fixing wedge (12) radially inward facing surface urges the second sealing lip radially inward.

2. The overrun air recirculation valve as claimed in claim 1, wherein the sealing lips (8, 9) are integrally connected to one another via a connecting portion (10).

3. The overrun air recirculation valve as claimed in claim 2, wherein the sealing lips (8, 9) form a V-shaped cross-sectional configuration.

4. The overrun air recirculation valve as claimed in claim 2, wherein the sealing lips (8, 9) form a U-shaped cross-sectional configuration.

5. The overrun air recirculation valve as claimed in claim 1, wherein the fixing wedge (12) is conical.

6. The overrun air recirculation valve as claimed in claim 1, wherein the fixing wedge (12) is of cylindrical form.

7. A compressor (2) of an exhaust-gas turbocharger (13), having
a compressor housing (14) which has a fastening flange (15)
an overrun air recirculation valve (1) having a valve housing (3) which has an interior (4) and a center axis (A) extending in an axial direction, a diaphragm (5), which is guided in the interior (4) and has an annularly encircling sealing means (6); and
a connecting means (7) provided on the valve housing (3), comprising a multiplicity of clip lugs which extend in the axial direction of the valve housing and which each comprise detent catches adapted for latching engagement with said compressor housing fastening flange (15),
the fastening flange (15) having an annularly encircling receiving groove (16), which is open, for receiving the annularly encircling sealing means (6),
the annularly encircling sealing means (6) comprising first and second sealing lips (8, 9),
wherein a fixing wedge (12) engages into a space (11) between the sealing lips (8,9),
wherein the fixing wedge (12) has a radially outward facing surface and a radially inward facing surface, and
wherein the fixing wedge (12) radially outward facing surface urges the first sealing lip radially outward to seal against the annularly encircling receiving groove (16), and the fixing wedge (12) radially inward facing surface urges the second sealing lip radially inward to seal against the annularly encircling receiving groove (16).

8. The compressor as claimed in claim 7, wherein the compressor housing (14) has an annularly encircling detent edge (17).

9. A method for the mounting of an overrun air recirculation valve (1) on a compressor housing (14) of a compressor (2) of an exhaust-gas turbocharger (13), having the following method steps:
preassembling a valve housing (3) which has a center axis (A) extending in an axial direction and a connecting means (7) provided on the valve housing (3) comprising a multiplicity of clip lugs which extend in the axial direction of the valve housing and which each comprise detent catches adapted for latching engagement with a fastening flange (15), and a diaphragm (5) to form an overrun air recirculation valve cartridge; and
fastening the overrun air recirculation valve cartridge to the compressor housing (14) by latching engagement of said multiplicity of clip lugs with said fastening flange (15),
wherein the diaphragm includes annularly encircling sealing means (6) comprising first and second sealing lips (8, 9), wherein a fixing wedge (12) engages into a space (11) between the sealing lips (8, 9), and wherein, during the course of the fastening the first and second sealing lips (8, 9) of the diaphragm (5) are radially sealed off in an annularly encircling receiving groove (16) of the fastening flange (15).

\* \* \* \* \*